(12) United States Patent
Schulz et al.

(10) Patent No.: US 6,972,534 B1
(45) Date of Patent: Dec. 6, 2005

(54) DELAY COMPENSATION FOR STABLE CURRENT REGULATION WHEN USING VARIABLE-DELAY RANDOM PWM SWITCHING

(75) Inventors: Steven E. Schulz, Torrance, CA (US); Daniel L. Kowalewski, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/933,679

(22) Filed: Sep. 3, 2004

(51) Int. Cl.[7] .................. H02K 23/00; H02P 5/06; G05B 5/165
(52) U.S. Cl. .............. 318/254; 318/254; 318/608; 388/811; 388/812; 388/813; 388/814; 388/815; 363/41
(58) Field of Search ............ 363/41, 132; 318/254, 318/608; 388/811, 813

(56) References Cited

U.S. PATENT DOCUMENTS

| | | | | |
|---|---|---|---|---|
| 5,057,759 A | * | 10/1991 | Ueda et al. | 318/616 |
| 5,656,908 A | * | 8/1997 | Rehm | 318/608 |
| 5,850,132 A | * | 12/1998 | Garces | 318/599 |
| 6,757,185 B2 | * | 6/2004 | Rojas Romero | 363/89 |
| 2003/0002299 A1 | * | 1/2003 | Trzynadlowski et al. | 363/21.1 |
| 2003/0046028 A1 | * | 3/2003 | Mir et al. | 702/183 |
| 2003/0076065 A1 | * | 4/2003 | Shafer et al. | 318/567 |
| 2005/0057199 A1 | * | 3/2005 | Herke et al. | 318/66 |

* cited by examiner

*Primary Examiner*—David Martin
*Assistant Examiner*—Elias B. Hiruy
(74) *Attorney, Agent, or Firm*—Christopher DeVries

(57) ABSTRACT

A control system for an electric machine having a rotor position sensor that generates a rotor position signal, a velocity module that generates an electric angular velocity value based on the rotor position signal, a random pulse width modulation module that generates a switching period and a delay for a current cycle, and a phase angle compensation module that sums a sample rate, one half of the switching period, and the delay of a previous cycle and that outputs a delay time. The phase angle compensation module further multiplies the delay time and the electric angular velocity value and generates a compensating angle.

12 Claims, 5 Drawing Sheets

Phase Angle Compensation

US 6,972,534 B1

DELAY COMPENSATION FOR STABLE CURRENT REGULATION WHEN USING VARIABLE-DELAY RANDOM PWM SWITCHING

FIELD OF THE INVENTION

The present invention relates to power converters and, more particularly, relates to a current regulation system used to compensate for the delay introduced by variable-delay random pulse width modulation.

BACKGROUND OF THE INVENTION

Random pulse width modulation (RPWM) is recognized as a desirable technique to reduce both electromagnetic and acoustic noise emissions from pulse width modulation (PWM) inverters. RPWM is generally characterized by random variations of the switching frequency. The random variations of the frequency alleviate undesirable characteristics in PWM electronic power converters. Specifically, the fundamental AC component harmonics remain unchanged. However, the spectral power, measured in Watts, is converted to continuous power density, measured in Watts per Hertz, instead of being concentrated in discrete harmonics. The power spectra of the output voltage and current from a RPWM power converter emulate the spectrum of white noise. Consequently, spurious phenomena are significantly mitigated.

Additionally, conventional variable-delay random pulse width modulation (VD-RPWM) may also be used for various applications to further alleviate undesirable characteristics. In fact, the variable-delay random PWM technique provides a number of significant advantages over other RPWM techniques.

Known prior art systems have demonstrated the excellent EMC performance of true random switching frequency modulation techniques where both the sampling and PWM periods are synchronized. However, these RSF systems suffer from a significant disadvantage, namely the maximum code size is limited by the minimum sample period. Furthermore, the random sample rate places a constraint on the minimum sample period based upon the required time to execute the application code. For complicated motor control algorithms, the length of code may not allow sufficiently high switching frequency to achieve good spectral spreading.

Fixed sample rate techniques, on the other hand, allow optimal use of the processor computational capability. For example, random zero vector, random center displacement, and random lead-lag techniques all maintain synchronous sample and PWM period, but suffer some form of limitation. For example, random zero vector and random center displacement lose effectiveness at high modulation indexes. Random lead-lag does not offer suitable performance with respect to reducing acoustic/EMI emissions and, further, suffers an increased current ripple. Additionally, both random lead-lag and random center displacement introduce an error in the fundamental component of current due to a per-cycle average value of the switching ripple.

The VD-RPWM technique allows a fixed sample rate for optimal usage of processor computational power, while providing quasi-random PWM output for good spectral spreading.

However, conventional VD-RPWM suffers from disadvantages when operated at high fundamental frequencies. For example, using a 4-pole induction machine with a maximum speed of 14 krpm, the highest fundamental electrical frequency is 467 Hz. In this situation, using a 12 kHz sample rate, conventional VD-RPWM techniques provide satisfactory control. On the other hand, when used with induction machines having eight or more poles, the highest fundamental electrical frequency may exceed 800 Hz. In these cases, the delay introduced by VD-RPWM may cause undesirable instability.

Accordingly, there exists a need in the relevant art to provide a modified VD-RPWM technique that is capable of overcoming the instability associated with the use of VD-RPWM with machines having high fundamental electrical frequencies (e.g. 500 Hz or higher) and limited sample rate (e.g. 12 kHz). Furthermore, there exists a need in the relevant art to provide a delay compensation technique to generate stable current regulation when using VD-RPWM. Still further, there exists a need in the relevant art to provide a modified VD-RPWM technique that overcomes the disadvantages of the prior art.

SUMMARY OF THE INVENTION

According to the principles of the present invention, a control system for an electric machine is provided having an advantageous construction. The control system includes a rotor position sensor that generates a rotor position signal, a velocity module that generates an electric angular velocity value based on the rotor position signal, a random pulse width modulation module that generates a switching period and a delay for a current cycle, and a phase angle compensation module that sums a sample rate, one half of the switching period, and the delay of a previous cycle and that outputs a delay time. The phase angle compensation module further multiplies the delay time and the electric angular velocity value and generates a compensating angle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality.

As discussed above, conventional variable-delay random pulse width modulation (VD-RPWM) provides a number of significant advantages over other RPWM techniques. According to conventional VD-RPWM, the sample rate (input), $T_{samp}$, remains constant while the PWM output period, $T_{sw}$, is randomly varied from $T_{sw\_min}$ to $2*T_{samp}$, where $T_{sw\_min}$ is the minimum PWM switching period to be allowed and $T_{samp}$ is the sample rate. This wide range in PWM output period provides excellent spectral spreading in many cases for improved modulation.

However, in applications having high fundamental electrical frequency and limited sample rate (for example, fundamental electrical frequencies above about 500 Hz with 12 kHz sample rates), conventional VD-RPWM techniques may exhibit significant control problems. In other words, in these cases, the additional delay introduced by conventional VD-RPWM becomes more critical and can cause instability.

It is undesirable to vary the sample rate (input) $T_{samp}$, since maintaining a constant sample rate offers many advantages. For example, many of the coefficients used in digital controllers are sample time dependent. By maintaining fixed sample rates, the need to recalculate coefficients every time the PWM period is changed is eliminated. Additionally, by maintain fixed sample rates, the time required for software execution remains fixed. This permits predictable and optimized usage of the microprocessor's capability and capacity. In other techniques that have variable sample rates, the maximum code length is limited by the minimum sample period. This may be a significant drawback in many applications.

Therefore, according to the principles of the present invention, a control system or algorithm is used compensate for the delay introduced by the VD-RPWM algorithm on a cycle-by-cycle basis to alleviate such control instability. This control system or algorithm is based on a fixed sample rate (input). The algorithm introduces a random delay into the trailing edge of the next PWM output cycle. Therefore, because two consecutive edges determine the PWM output period, a quasi-random PWM output is created.

Figure 1:
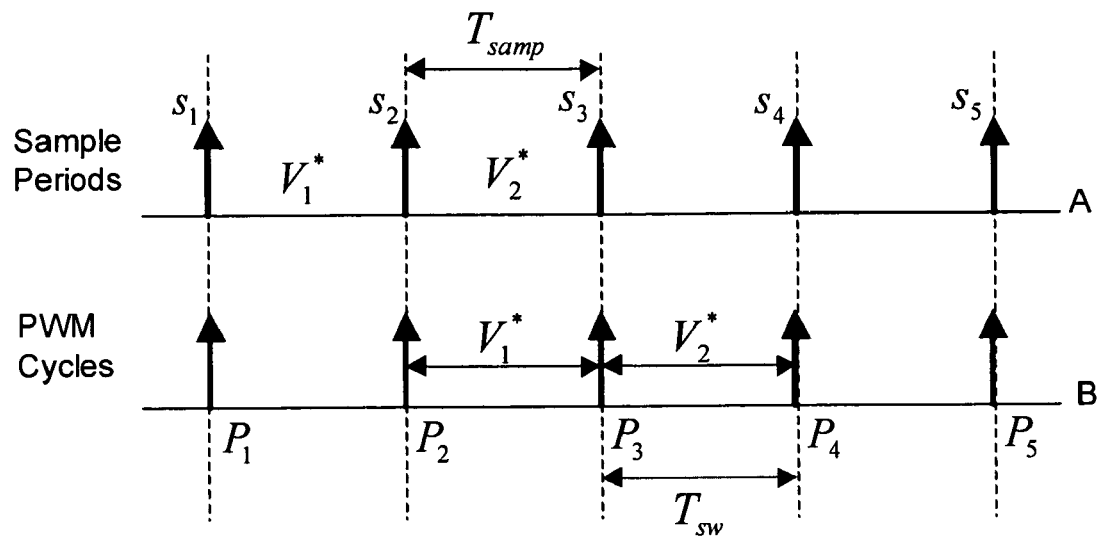
FIG. 1 is a schematic representation illustrating a fixed frequency PWM algorithm according to the prior art.

Referring to FIG. 1, a schematic representation of a fixed frequency PWM algorithm is illustrated. More particularly, a sample sequence is defined along timeline A having samples $S_1$, $S_2$, $S_3$, $S_4$, and $S_5$. Similarly, a PWM output sequence is defined along timeline B having cycle edges $P_1$, $P_2$, $P_3$, $P_4$, and $P_5$. A voltage command $V_1*$ is calculated between samples $S_1$ and $S_2$ using the sample information obtained at $S_1$. The PWM output for the command $V_1*$ is implemented during the next period, namely between $P_2$ and $P_3$. Conventionally, the average output voltage occurs in the center of the period between $P_2$ and $P_3$. Hence, the time from $S_1$ to the average output of $V_1*$ is 1.5 sample periods, or 1.5 $T_{samp}$. In fixed frequency applications, such as that illustrated in FIG. 1, the delay compensation does not vary with time. For the waveforms produced in connection with the schematic of FIG. 1 with no delay (i.e. $\Delta t_1 = \Delta t_2 = 0$), the usual phase angle compensation is given by equation (1):

$$\Delta\theta_{fixed\_freq} = 1.5 T_{samp} \omega_e \qquad (1)$$

Figure 2:
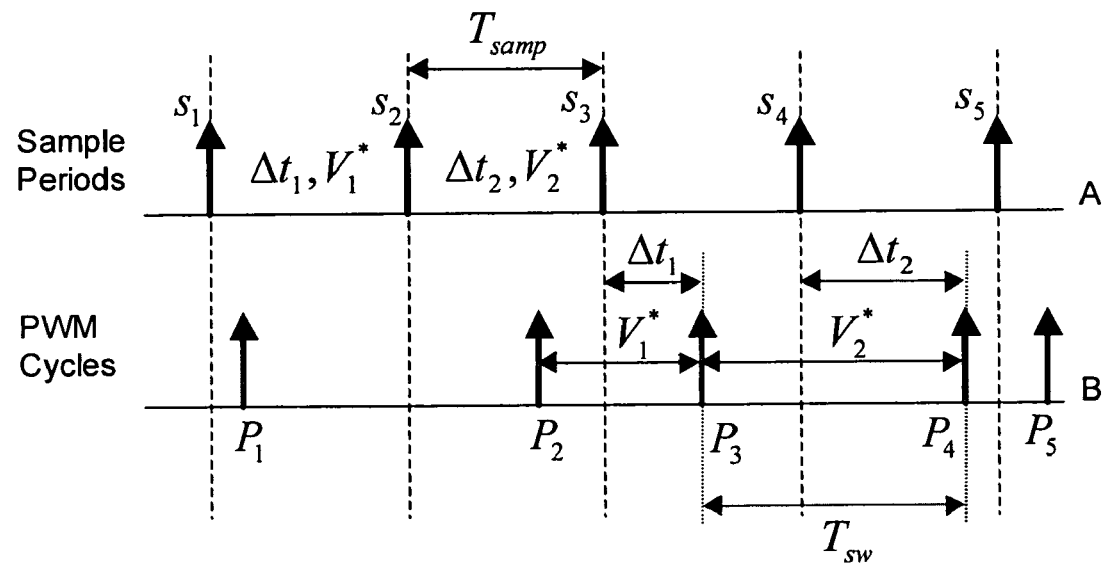
FIG. 2 is a schematic representation illustrating a variable-delay random PWM algorithm.

Turning now to FIG. 2, a schematic representation of a variable-delay random PWM algorithm is illustrated. More particularly, a sample sequence is defined along timeline A having samples $S_1$, $S_2$, $S_3$, $S_4$, and $S_5$. Similarly, a PWM output sequence is defined along timeline B having cycle edges $P_1$, $P_2$, $P_3$, $P_4$, and $P_5$. In this case, the PWM output periods are not of fixed length. As described above in connection with FIG. 1, the voltage command $V_1*$ is calculated between samples $S_1$ and $S_2$ using the sample information obtained at $S_1$. The PWM output for the command $V_1*$ is then implemented during the next period, namely between $P_2$ and $P_3$. However, in this case, $P_2$ and $P_3$ are shifted or delayed as shown.

With reference to the voltage command $V_2*$ computed between $S_2$ and $S_3$, the corresponding PWM output occurs between $P_3$ and $P_4$. The delay, $T_{delay}$, from the sample time $S_2$ to the middle of the PWM switching period $T_{sw}$ is given as:

$$T_{delay} = T_{samp} + \Delta t_1 + 0.5 T_{sw} \qquad (2)$$

The generic equation for the delay, $T_{delay}$, is:

$$T_{delay} = T_{samp} + \Delta t * Z^{-1} + 0.5 T_{sw} \qquad (3)$$

The algorithm of the present invention is to be utilized as part of a synchronous frame current regulator for motor drive applications. According to the present invention, the PWM delay is changed every sample period. For this reason, the delay compensation must be updated based upon the next delay value and PWM period as follows:

$$\Delta\theta_{VDRPWM} = (T_{samp} + \Delta t^* Z^{+1} + 0.5 \cdot T_{sw})\omega_e \qquad (4)$$

The compensating angle $\Delta\theta$ VDRPWM given in equation (4) is added to the measured rotor position, $\theta_r$, prior to performing the synchronous to stationary transformation on the voltage commands. This compensation accounts for the rotation of the machine from the time the position and current are sampled to the time the voltage command is implemented by the power inverter or control system.

Figure 3:
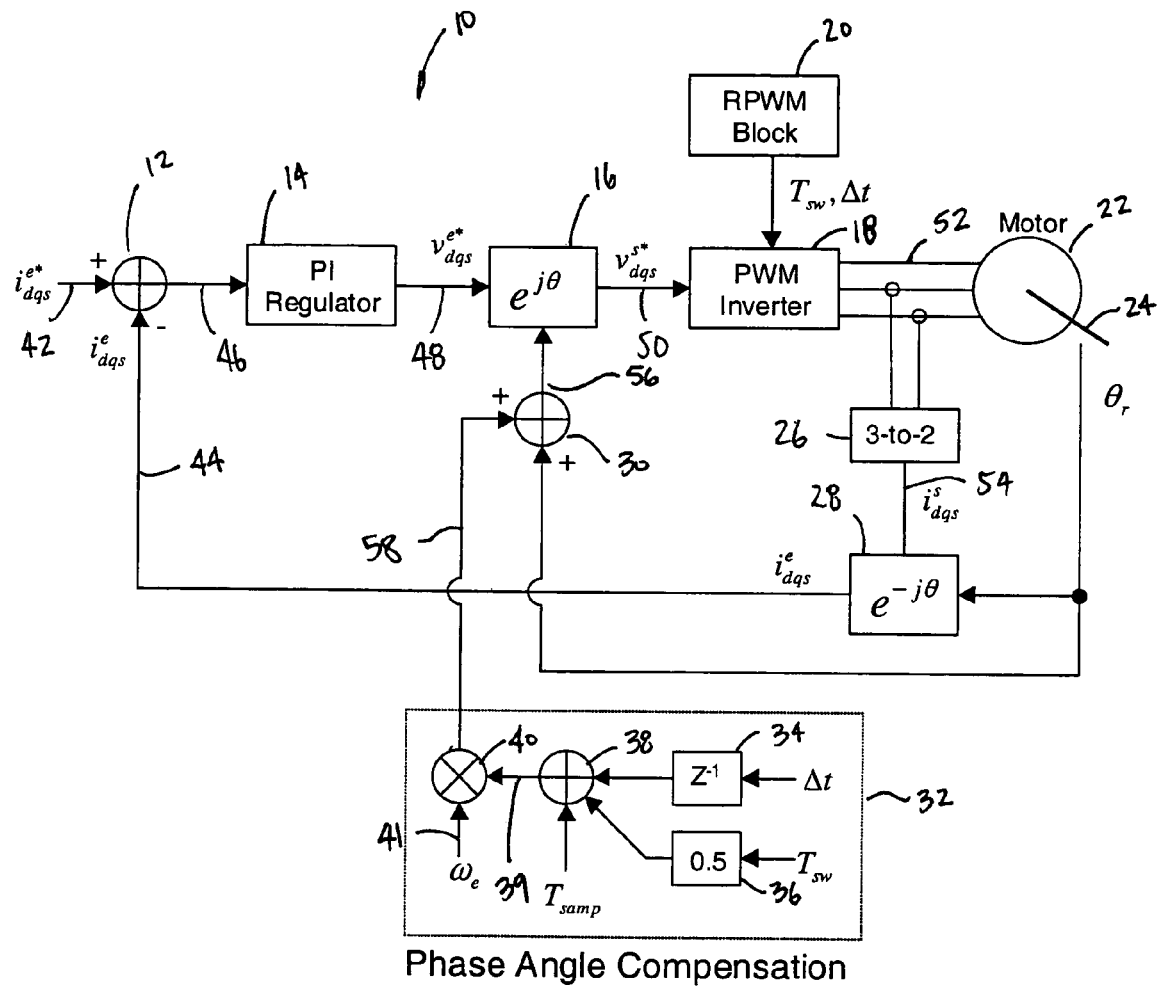
FIG. 3 is a functional block diagram of a control system for variable-delay random PWM incorporating the present invention.

As best seen in FIG. 3, a block diagram of a control system 10 according to the present invention is illustrated. The input to control system 10 includes synchronous reference frame current commands, $i_{dqs}^{e*}$ 42. Current commands 42 are compared to measured synchronous reference frame currents $i_{dqs}^{e*}$ 44 using a summer 12. Summer 12 outputs an error signal 46, which is passed to a synchronous frame PI current regulator 14. The output of current regulator 14 is a synchronous reference frame voltage command $V_{dqs}^{e*}$ 48. A synchronous to stationary reference frame transformation block 16 then uses the output of summer 30 for the transformation angle to generate stationary frame voltage commands $V_{dqs}^{s*}$ 50. A random PWM block 20 generates a delay time, $\Delta t$, and switching period, $T_{sw}$, needed to implement the variable-delay random PWM technique.

A PWM inverter 18 processes the stationary frame voltage commands and the delay and switching period from random PWM block 20 to generate a PWM voltage output 52 to be applied to a motor 22. A sensor 24 measures the rotor position $\theta_r$ of motor 22. However, it should be understood that in addition to measuring, rotor position $\theta_r$ may be estimated. Sensor 24 may be a rotor position sensor that, when used in synchronous machine, outputs a measured position. A derivative of the measure position may be used to determine the corresponding speed or angular velocity. Similarly, sensor 24 may be a position sensor as described or an angular velocity sensor, which is used to integrate to determine the corresponding speed.

As can be seen, only two phase currents are measured, while a third is calculated from the two measured quantities. A 3-to-2 transformation block 26 is used to convert the phase a, b, c currents to equivalent two-phase components $i_{dqs}{}^s$ 54. A transformation module 28 uses the rotor position and converts the stationary reference frame currents $i_{dqs}{}^s$ to the synchronous reference frame currents $i_{dqs}{}^e$ 44. Block 32 represents the phase angle compensation block, which implements the phase angle compensation computed in equation (3). More particularly, block 34 is a unit delay (delay of $T_{samp}$). A gain block 36 scales the switching period $T_{sw}$ by ½. The summer 38 is used to compute the delay time 39, $T_{delay}$. The output of summer 38 is multiplied by the electrical angular velocity $\omega_e$ 41 to determine the phase angle compensation. The output of block 32, namely a compensating angle $\Delta\theta_{VDRPWM}$ 58, is added to the rotor position, $\theta_r$ by summer 30. The output of summer 30, namely a transformation angle 56, is then used in the synchronous-to-stationary transformation of the voltage commands at synchronous to stationary reference frame transformation block 16.

While the block diagram is shown for synchronous type machines, a similar diagram can be obtained for asynchronous machines by including the slip angle calculation. In this case, the delay compensation is still added to the angle used in the synchronous-to-stationary transformation.

Figure 4:
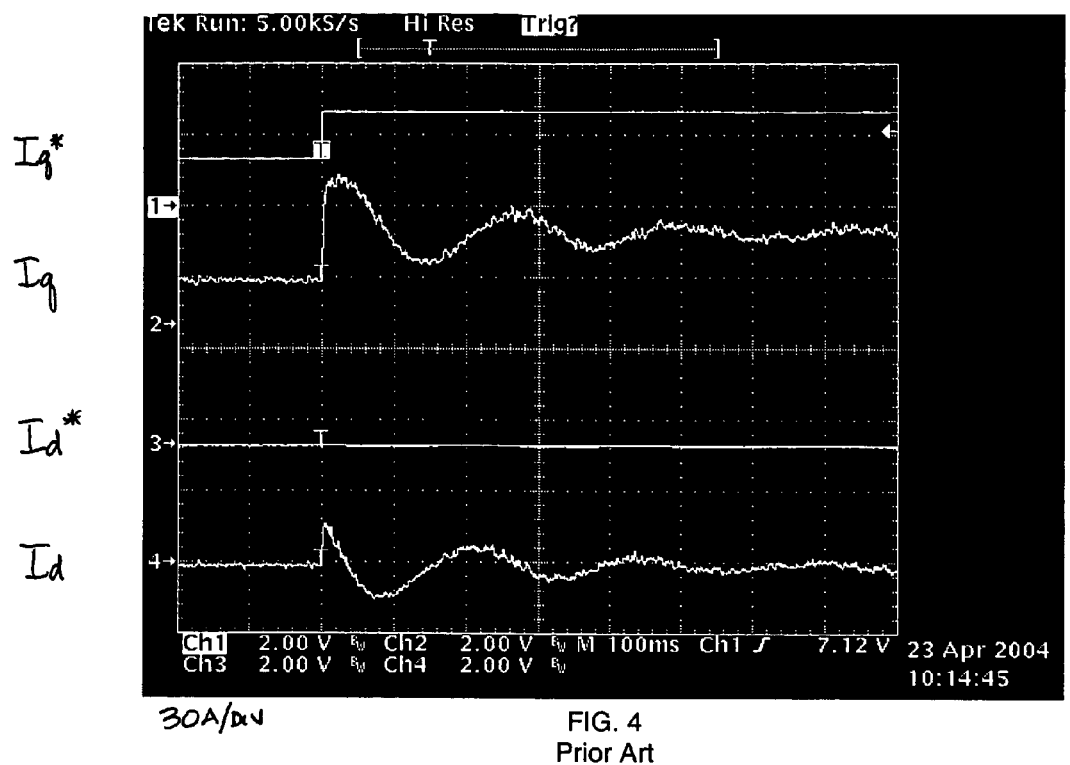
FIG. 4 is a graph illustrating a response of a prior art system having no delay compensation.

To demonstrate the effectiveness of the present invention, laboratory tests were conducted utilizing a 600 V/600 A power inverter with floating point processor and an inductive load. VD-RPWM was implemented in the software. The sample rate was set to 11.1 kHz (90 usec). The fundamental electrical frequency was set to 800 Hz. To test the dynamic response, the q-axis current command was given a step input of 20→40 A. Ideally, the q-axis current would respond quickly with no overshoot, and there would be no cross-coupling into the d-axis. It should be noted that the PI regulators had the appropriate decoupling for the inductive load. Current regulator bandwidth was set to 4600 rad/sec. Referring to FIG. 4, a response is illustrated where no delay compensation is utilized (i.e. prior art system). As can be seen, a lightly damped response with overshoot and ringing is observed. This is caused by the delay which is not being compensated in the control.

Figure 5:
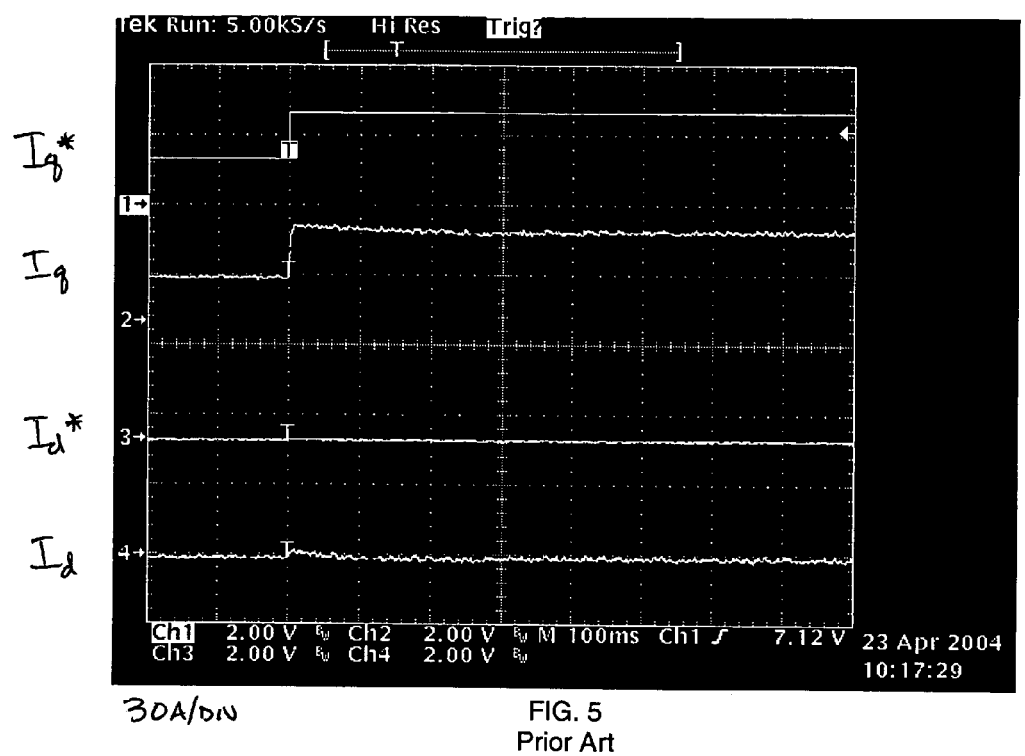
FIG. 5 is a graph illustrating a response of a prior art system employing a fixed delay compensation.

Similarly, as seen in FIG. 5, the fixed delay compensation given in equation 1 is applied. This results in a drastic improvement in the transient response. However, overshoot in the q-axis current is visible, and there is still cross coupling into the d-axis.

Figure 6:
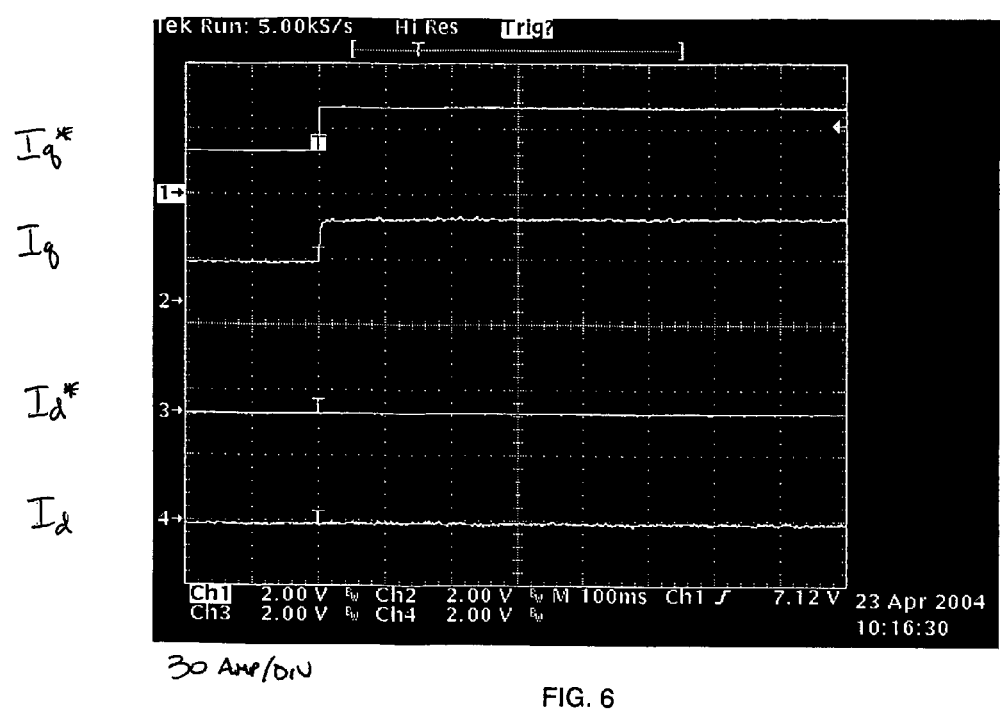
FIG. 6 is a graph illustrating a response of the control system of the present invention.

Finally, as seen in FIG. 6, the compensation technique according to the present invention as set forth in equation 5 is employed. The transient response is almost ideal in this case. The q-axis regulator has no overshoot, and there is no visible cross coupling into the d-axis. This experiment demonstrates the effectiveness of the present invention.

The present invention provides a number of advantages over the prior art. By way of non-limiting example, the present invention provides a method of maintaining control stability of high speed motors. Additionally, by facilitating RPWM operation at high speed, EMI emissions are reduced, thereby requiring smaller filtering requirements. Smaller filtering requirement consequently lead to reduced overall size, reduced cost, and lower weight. Still further, the present invention leads to reduced acoustic noise. This is particularly important when lower switching frequency is used in that it results in lower switching losses in the inverter when operating at low speeds.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an electric machine, comprising:
    a rotor position sensor that generates a rotor position signal;
    a velocity module that generates an electric angular velocity value based on said rotor position signal;
    a random pulse width modulation module that generates a switching period and a delay for a current cycle; and
    a phase angle compensation module that sums a sample rate, one half of said switching period, and said delay of a previous cycle and that outputs a delay time and that multiplies said delay time and said electric angular velocity value to generate a compensating angle.

2. The control system according to claim 1 further comprising:
    a second summer that sums said compensating angle and said rotor position value to generate a transformation angle.

3. The control system according to claim 2 further comprising:
    a synchronous-to-stationary transformation module that receives said transformation angle and a synchronous reference frame voltage command and that outputs a stationary frame voltage command.

4. The control system according to claim 3 further comprising:
    a subtractor that subtracts a measured synchronous reference frame current from a current command and that outputs an error signal; and
    a current regulator that receives said error signal and that generates said synchronous reference frame voltage command.

5. The control system according to claim 1 wherein said rotor position sensor is a sensorless sensor that senses inductance in windings of said electric machine and generates said rotor position signal based thereon.

6. The control system according to claim 1 wherein said rotor position sensor includes a transducer that measures a position of said rotor.

7. A control system for an electric machine, comprising:
    a rotor position sensor that generates a rotor position signal;
    a velocity module that generates an electric angular velocity value based on said rotor position signal;
    a random pulse width modulation module that generates a switching period and a delay for a current cycle;
    a phase angle compensation module that sums a sample rate, one half of said switching period, and said delay of a previous cycle and that outputs a delay time and that multiplies said delay time and said electric angular velocity value to generate a compensating angle; and
    a pulse width modulation inverter module that receives a synchronous reference frame voltage command, said switching period, and said delay and that generates a voltage output to said electric machine.

8. The control system according to claim 7 further comprising a second summer that sums said compensating angle and said rotor position value to generate a transformation angle.

9. The control system according to claim 8 further comprising a synchronous-to-stationary transformation module that receives said transformation angle and a synchronous reference frame voltage command and that outputs a stationary frame voltage command.

10. The control system according to claim 9, further comprising:
- a subtractor that subtracts a measured synchronous reference frame current from a current command and that outputs an error signal; and
- a current regulator that receives said error signal and that generates said synchronous reference frame voltage command.

11. The control system according to claim 7 wherein said rotor position sensor is a sensorless sensor that senses inductance in windings of said electric machine and that generates said rotor position signal based thereon.

12. The control system according to claim 7 wherein said rotor position sensor includes a transducer that measures a position of said rotor.

* * * * *